July 8, 1930.  P. R. MORRISON  1,770,278
VEHICLE SPRING APPARATUS
Filed Feb. 24, 1928  2 Sheets-Sheet 1
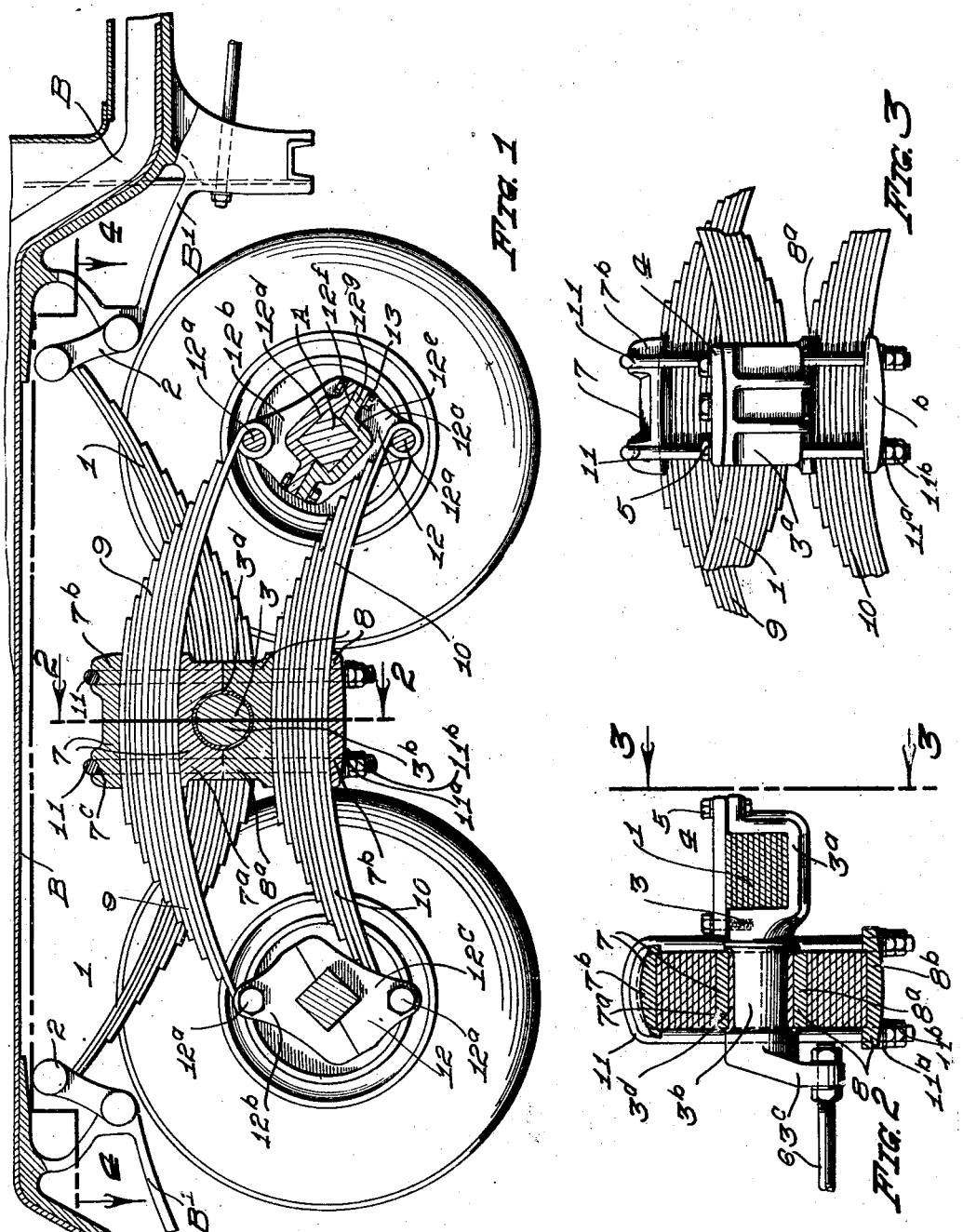
INVENTOR.
PAUL R. MORRISON
BY A. B. Bowman
ATTORNEY

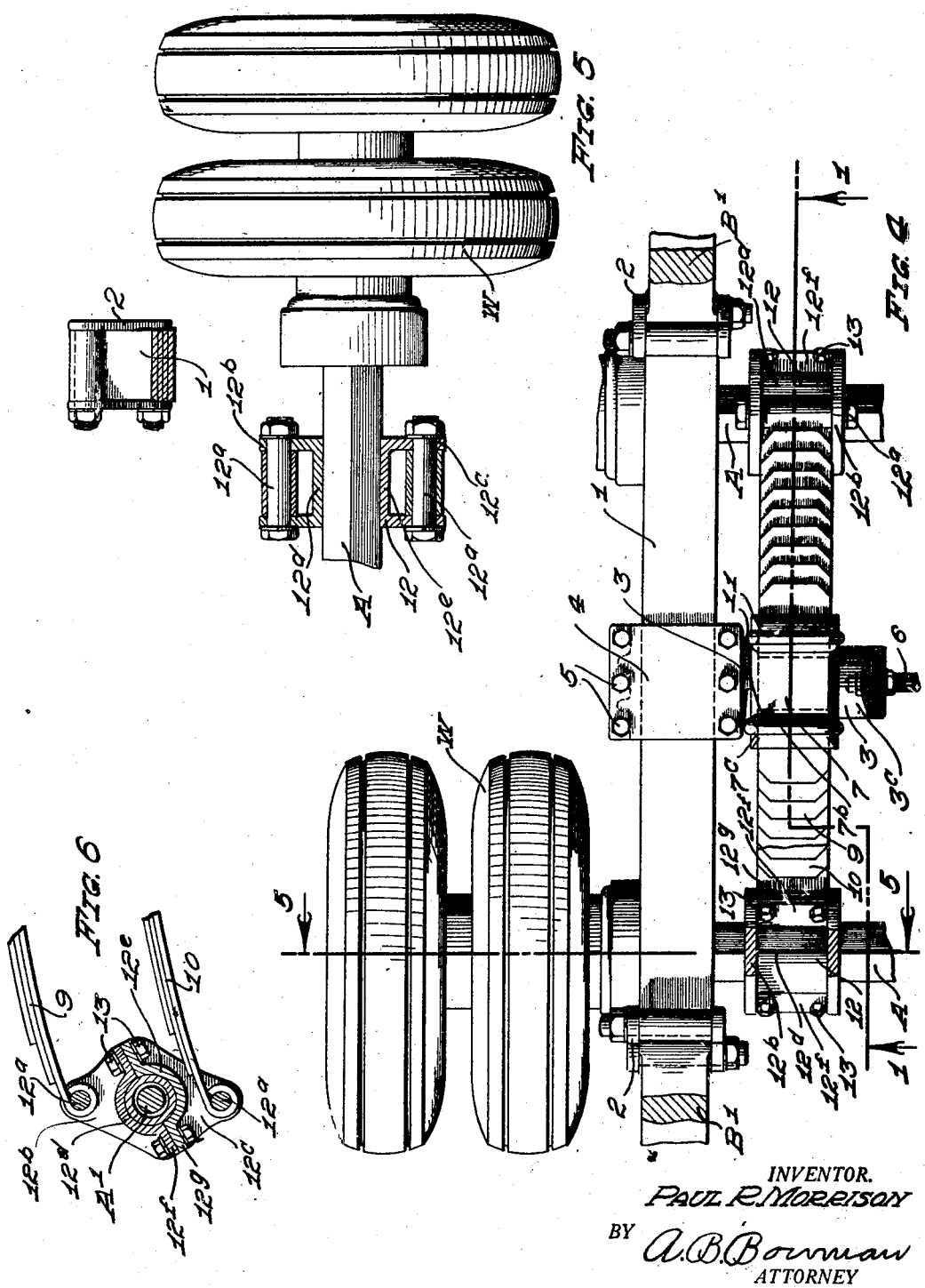

Patented July 8, 1930

1,770,278

UNITED STATES PATENT OFFICE

PAUL R. MORRISON, OF SAN DIEGO, CALIFORNIA, ASSIGNOR TO MODERN MACHINE AND AUTO BODY CO., OF SAN DIEGO, CALIFORNIA, A CORPORATION OF CALIFORNIA

VEHICLE SPRING APPARATUS

Application filed February 24, 1928. Serial No. 256,511.

My invention relates to vehicle spring apparatus and the objects of my invention are: first, to provide a spring apparatus of this class which is especially adapted for vehicles such as buses or trucks which have double axles; second, to provide a spring apparatus of this class in which a master spring is pivotally connected to a spring set the one end of which is secured to the one axle and the other end of which is secured to another axle thereby permitting the maximum movement of one axle relative to the other while at the same time permitting the contact of all wheels upon the ground at all times; third, to provide a spring apparatus of this class which may be used in connection with vehicles which neither, either, or both of the double axles thereof are power driven; fourth, to provide a spring apparatus of this class which may be easily installed on the conventional type of vehicle having double axles; fifth, to provide a spring apparatus of this class in which sets of springs secured at their ends to axles permit a maximum independent movement of each axle thereby permitting the wheels secured to the ends of the axles to remain on the ground at all times; sixth, to provide a spring apparatus of this class in which a master spring absorbs the ordinary road shocks and in which other springs reduce the greater road shocks before reaching said master spring, thus all road shocks whether great or small will impart a minimum of vibration to the body of the vehicle; seventh, to provide a spring apparatus of this class in which a rocking movement of a set of springs relative to a master spring enables any wheel to pass over an obstacle not encountered by the other wheels without materially affecting the master spring; eighth, to provide a spring apparatus of this class which may be easily assembled or unassembled for repairs or adjustment; ninth, to provide a spring apparatus of this class of which the upper extremities thereof are a minimum distance from the ground thus permitting the floor line of the vehicle to be at a minimum height; and, tenth, to provide a spring apparatus of this class which is simple of construction proportionate to its functions, durable, especially designed to withstand excessive wear and strain and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a sectional view through 1—1 of Fig. 4 with parts and portions shown in elevation to facilitate the illustration and the adjacent portion of a vehicle shown in connection therewith; Fig. 2 is a transverse sectional view through 2—2 of Fig. 1 with parts and portions shown in elevation to facilitate the illustration; Fig. 3 is a fragmentary elevational view from the line 3—3 of Fig. 2; Fig. 4 is a top or plan view thereof from the line 4—4 of Fig. 1 with the connecting portion of a vehicle shown in section; Fig. 5 is a sectional view thereof through 5—5 of Fig. 4 with parts and portions shown in elevation to facilitate the illustration; Fig. 6 is a sectional view showing the adaptation of my spring apparatus to the conventional power axle of a vehicle.

The master spring 1, hanger 2, support clamp 3, support clamp cap 4, bolt 5, tie rod 6, upper spring clamp member 7, lower spring clamp member 8, upper spring 9, lower spring 10, strap bolts 11, split spool shackle 12, and bolts 13 constitute the principal parts and portions of my spring apparatus.

The master spring 1 is similar in construction to the conventional semi-elliptical spring having a plurality of curved leaves, the end portions thereof curving toward the body B of a vehicle. The upper, longer leaf of the master spring 1 is secured at its end to hangers 2 which in turn are secured to suitable perches $B^1$ of the vehicle body B. The lower or central portion of the master spring 1 is secured to a support clamp 3 by means of a clamp portion 3ª thereof, as shown best in Figs. 2 and 3 of the drawings. A support clamp cap 4 extends across the upper side of the spring 1 and is secured to the clamp portion 3ª of the support clamp by means of bolts 5. The clamp portion 3ª of the support clamp 3 merges into a support portion 3ᵇ which is in the form of a bearing. The bearing 3ᵇ in turn merges into a projection 3ᶜ, to which is secured a tie rod 6 which is shown fragmentarily in Figs. 2 and 4 of the drawings. The tie rod 6 extends from the support clamp 3 to a similar support clamp 3, not shown, positioned at the other side portion of the vehicle and holds the two support clamps 3 in alinement with each other. A bushing 3ᵈ is mounted on the support bearing 3ᵇ.

A pair of bearing sectors 7ª and 8ª which form the one jaw of the upper spring clamp member 7 and the lower spring clamp member 8 respectively, extend around the bushing 3ᵈ. An upper spring 9 is mounted between the bearing sector or lower clamp portion 7ª and an upper clamp portion 7ᵇ. Similarly the lower spring 10 is mounted between the bearing sector or clamp portion 8ª and the lower clamp portion 8ᵇ, as shown best in Figs. 1 and 2 of the drawings. A pair of strap bolts 11 extend across the upper clamp portion 7ᵇ in grooves 7ᶜ formed therein. The extremities of the strap bolts 11 are threaded and extend through boss portions 8ᶜ of the lower clamp portion 8ᵇ. Washers 11ª and nuts 11ᵇ secure the strap bolts in place, thereby rigidly securing the upper and lower springs in spaced apart and superposed relation to each other and permitting their rotation about the bearing or support portion 3ᵇ. The upper spring 9 and the lower spring 10 are preferably identical in shape and size and preferably in the form of semi-ellipses with their outer portions extending downwardly. The adjacent end portions of the springs 9 and 10 are secured by means of bolts 12ª to the end flanges 12ᵇ and 12ᶜ respectively, of a split spool shackle 12 which is split diametrically. The sections 12ᵈ and 12ᵉ of the hub portion extend around and clamp the axle A. Side flanges 12ᶠ and 12ᵍ extend between the end flanges 12ᵇ and 12ᶜ respectively, flush with their respective hub sections. Bolts 13 extend through the side flanges 12ᶠ and 12ᵍ and hold the two regiments of the spool shackle together.

It will be noted that by merely changing the shape of the hub that any conventional type of vehicle axle may be accommodated. As shown in Fig. 6, the substituting of a power transmitting axle A¹ does not affect the function of my spring apparatus.

It will be noted with the spring construction as illustrated in the drawings that the master spring 1 is considerably larger than the springs 9 and 10 and hence absorbs the ordinary shocks of the road. Furthermore, the springs 9 and 10 being heavier than the master spring 1 tend to absorb the greater road shocks with a minimum movement. Consequently, the shocks received by the master spring tend to be of constant force. Thus the vehicle will ride with a maximum of smoothness. The pivoting of the two springs 9 and 10 relative to the master spring 1 permits the wheels to remain on the ground at all times even though one wheel may be rising over an obstacle not encountered by the other. Thus an extreme degree of flexibility is provided, at the same time, permitting the use of strong springs which are capable of supporting relatively large weight.

It will also be noted that the floor line B¹ of the vehicle where it passes over the wheels W need only be made high enough to permit the movement of the wheels, the upper portion of the spring being no higher than the clearance necessary for ordinary movement of the wheel.

Though I have shown and described a particular construction, combination and arrangement of parts and portions, I do not wish to be limited to this particular construction, combination and arrangement of parts and portions but desire to include in the scope of my invention the construction, combination and arrangement substantially as set forth in the appended claims.

Having thus described my invention, what I claim as new and desire to secure by Letters Patent is:

1. In a spring apparatus of the class described, a set of curved springs the one superposed directly above the other, a single curved spring pivotally connected therewith and positioned at the side of said set of springs and extending in a reverse direction.

2. In a spring apparatus of the class described, a set of curved springs the one superposed directly above the other, a single curved spring pivotally connected therewith and positioned at the side of said set of springs and extending in a reverse direction, means for securing the extremities of said set of springs to axles and other means for securing the said single spring to a vehicle frame.

3. In a spring apparatus of the class described, a master spring secured at its ends to a vehicle frame, a set of springs curved in the same direction and the one superposed directly above the other and pivotally connected at the central side portion of said master spring.

4. In a spring apparatus of the class described, a master spring secured at its end portions to a vehicle frame, a set of springs curved in the same direction and the one superposed directly above the other and pivotally secured at the central side portion of said master spring, and means for securing the ends of said set of springs to an axle.

5. In a spring apparatus of the class described, a master spring secured at its end portions to a vehicle frame, a set of springs curved in the same direction and the one superposed directly above the other and pivotally secured at the central side portion of said master spring, means for securing the ends of said set of springs to an axle, and a split spool shackle pivotally secured to the end of said spring set and clamped to the axle.

6. In a spring apparatus of the class described, a master spring secured at its end portions to a vehicle, a clamp means secured to the central portion of said master spring, a support portion extending from the side of said clamp forming a bearing, a double clamp means mounted on said bearing, and a pair of springs secured by said double clamp, the upper spring positioned above said bearing, and the other spring positioned below said bearing.

7. In a spring apparatus of the class described, a master spring secured at its end portions to a vehicle, a clamp means secured to the central portion of said master spring, a support portion extending from the side of said clamp forming a bearing, a double clamp means mounted on said bearing, a pair of springs secured by said double clamp, the upper spring positioned above said bearing, and the other spring positioned below said bearing, a split spool shackle secured to and extending between said upper and lower spring, and an axle secured between the sections of said split spool shackle.

8. In a spring apparatus of the class described, a master spring movably secured at its ends to a vehicle frame, and a pair of superposed spaced apart springs pivotally mounted intermediate the ends of said master spring at the side thereof, and connected to the vehicle axles.

9. In a spring apparatus of the class described, a master spring movably secured at its ends to a vehicle frame, a pair of superposed spaced apart springs curved in the same direction and pivotally mounted intermediate the ends of said master spring at the side thereof, means for securing the ends of said superposed springs to either side of an axle.

10. In a spring apparatus of the class described, a master spring movably secured at its ends to a vehicle frame, a pair of superposed spaced apart springs curved in the same direction rotatably mounted intermediate the ends of said master spring at the side thereof and split spool members clamped to axles and secured to the ends of said superposed springs.

11. In a spring apparatus of the class described, a master spring movably secured at its ends to a vehicle frame, a pair of superposed spaced apart springs curved in the same direction pivotally mounted at the central side portion of said master spring the ends of said superposed springs extending in the opposite direction to the ends of said master spring, axles extending transversely between the ends of said superposed springs and spool members secured to said axles and to said superposed springs.

In testimony whereof, I have hereunto set my hand at San Diego, California, this 11th day of February, 1928.

PAUL R. MORRISON.